United States Patent [19]

Enzmann

[11] Patent Number: 4,835,954
[45] Date of Patent: Jun. 6, 1989

[54] COMBINE HEADER WITH SKID PLATES

[75] Inventor: Michael H. Enzmann, Blue Springs, Mo.

[73] Assignee: Deutz-Allis Corporation, Milwaukee, Wis.

[21] Appl. No.: 151,952

[22] Filed: Feb. 3, 1988

[51] Int. Cl.4 ............................................. A01D 41/14
[52] U.S. Cl. ...................................... 56/303; 56/296; 56/314
[58] Field of Search ................. 56/119, 208, 296, 314, 56/318, 364, 14.6, 303

[56] References Cited

U.S. PATENT DOCUMENTS

| 2,814,174 | 11/1957 | Zimmer | 56/314 |
| 2,910,820 | 11/1959 | Harvey et al. | 56/314 |
| 2,963,845 | 12/1960 | Matile | 56/314 |
| 3,349,549 | 10/1967 | VanderLely | 56/314 |
| 3,967,439 | 7/1976 | Mott | 56/314 |
| 4,441,307 | 4/1984 | Euzmann | 56/208 |
| 4,550,555 | 11/1985 | Rohlik | 56/314 |
| 4,599,852 | 7/1986 | Kerber et al. | 56/208 |
| 4,776,153 | 10/1988 | DePauw et al. | 56/208 |

Primary Examiner—John Weiss
Attorney, Agent, or Firm—Charles L. Schwab

[57] ABSTRACT

A pair of plastic skid plates are secured to the underside of skid pads at opposite lateral ends of a floating cutterbar and are connected at their forward ends to the dividers, at laterally opposite ends of a combine header, by elastic connectors.

4 Claims, 2 Drawing Sheets

COMBINE HEADER WITH SKID PLATES

TECHNICAL FIELD

This invention relates to agricultural harvesting equipment having a crop header with a floating cutterbar and crop dividers at its laterally opposite ends.

PRIOR ART STATEMENT

When a combine header is lowered to cut crop close to the ground, the underside of the header, and the crop dividers at its laterally opposite sides, may skid on the ground. It has been customary for combine manufacturers to put skids on the underside of the header and the underside of the dividers. Several auxiliary equipment suppliers have offered plastic sheeting suitable for use on the underside of headers. In one prior art header using a floating cutterbar, as illustrated in FIG. 1 of the drawings, a bent metal plate is bolted to each of the opposite ends of the floating cutterbar in positions directly below and in general longitudinal alignment with the crop dividers. The upward sloping front end of these prior art skid plates terminate in a free end which is not secured to anything. In other words the skid plate is a cantilever. In use, it has been formed that these prior art skid plates become excessively bent and deformed, due to striking rocks and the like, over a relatively short useful life. It has also been found that soil tends to stick to the metal skid plate.

OBJECTS AND SUMMARY OF THE INVENTION

It is a general object of this invention to provide skid plates which help prevent a floating cutterbar from becoming mired in mud.

It is a further object of this invention to provide flexible skid plates for opposite ends of a floating cutterbar which are resiliently connected at their forward ends to forward points of crop dividers at opposite lateral ends of a crop header.

It is a further object to provide skid plates as in the foregoing objects which have a smooth non-stick bottom surface.

The skid plates of this invention are particularly useful on a combine header having a floating cutterbar disposed at the front end of the header platform. The floating cutterbar is connected to the header platform in such a way that it is free to move up and down relative to the platform so as to follow the contour of the ground. This is important in harvesting crops such as soy beans because pods develop along the entire height of the plant, including near the ground. The skid plates are fastened at their rear ends beneath the laterally opposite ends of the floating cutterbar with their underside surfaces skidding on the ground during a harvesting operation.

The skid plates are resiliently flexible and extend forwardly and upwardly, terminating in front ends which are connected to the front portions or points of the laterally opposite dividers by resiliently yieldable connectors. The dividers may be constructed with laterally spaced side walls forming a downwardly open interior cavity into which the forward ends of the skid plates extend.

Preferably the skid plates are fabricated from flat sheets of high density plastic such as ultra high molecular weight polyethylene which provides a smooth non-stick surface for engagement with the ground and which has excellent wearing qualities.

The resiliently yieldable connector may take the form of a resiliently elongated spring member such as a rubber-like garter or strap.

BRIEF DESCRIPTION OF THE DRAWINGS

A prior art illustration and one version of the invention are shown in the drawings in which.

DETAILED DESCRIPTION OF THE DRAWINGS

Figure 1:
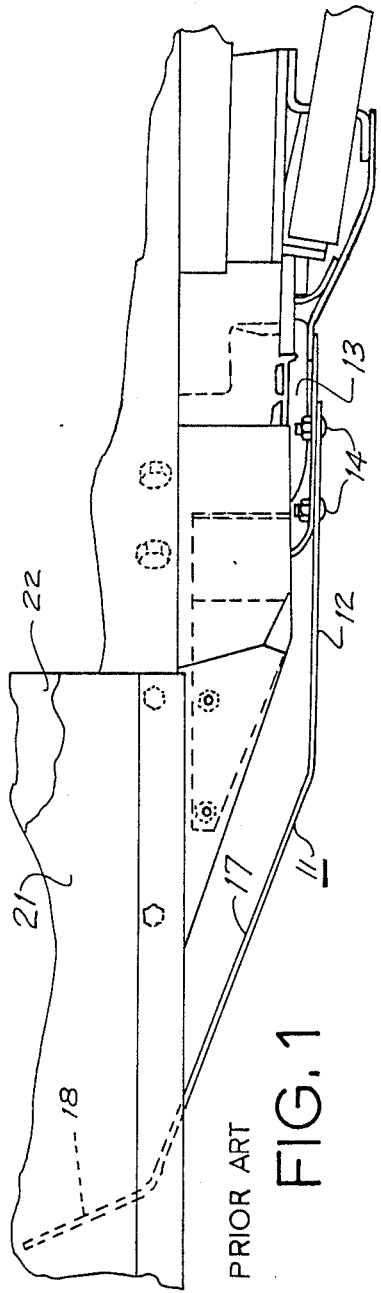
FIG. 1 is a side elevation view of part of a combine header showing a prior art metal skid plate.

In the prior art illustration of FIG. 1 the metal skid plate 11 has its horizontal rear portion 12 rigidly secured to the underside of the cutterbar 13 by bolts and nuts 14, 16 at a point forward of the cutterbar 13. The skid plate 11 is bent upwardly at a first acute angle to provide an intermediate portion 17 which extends forwardly and upwardly to a front portion 18 which is bent upwardly at an acute angle relative to the intermediate portion 17. The front portion 18 is disposed between laterally spaced side walls 21, 22 of a divider at one lateral end of the header. In use the metal skid plate 11 becomes deformed due to its striking rocks and ruts in fields being harvested. Thus, instead of a smooth sliding surface, the bottom of the skid plate resists sliding when harvesting with damp soil conditions. In soil with substantial clay content the soil will tend to stick to the bottom surface, thus increasing power requirements and wear of components of the harvester and its propelling engine. In some field conditions the metal skid plate becomes bent out of shape in a relatively short time and must be replaced.

Figure 2:
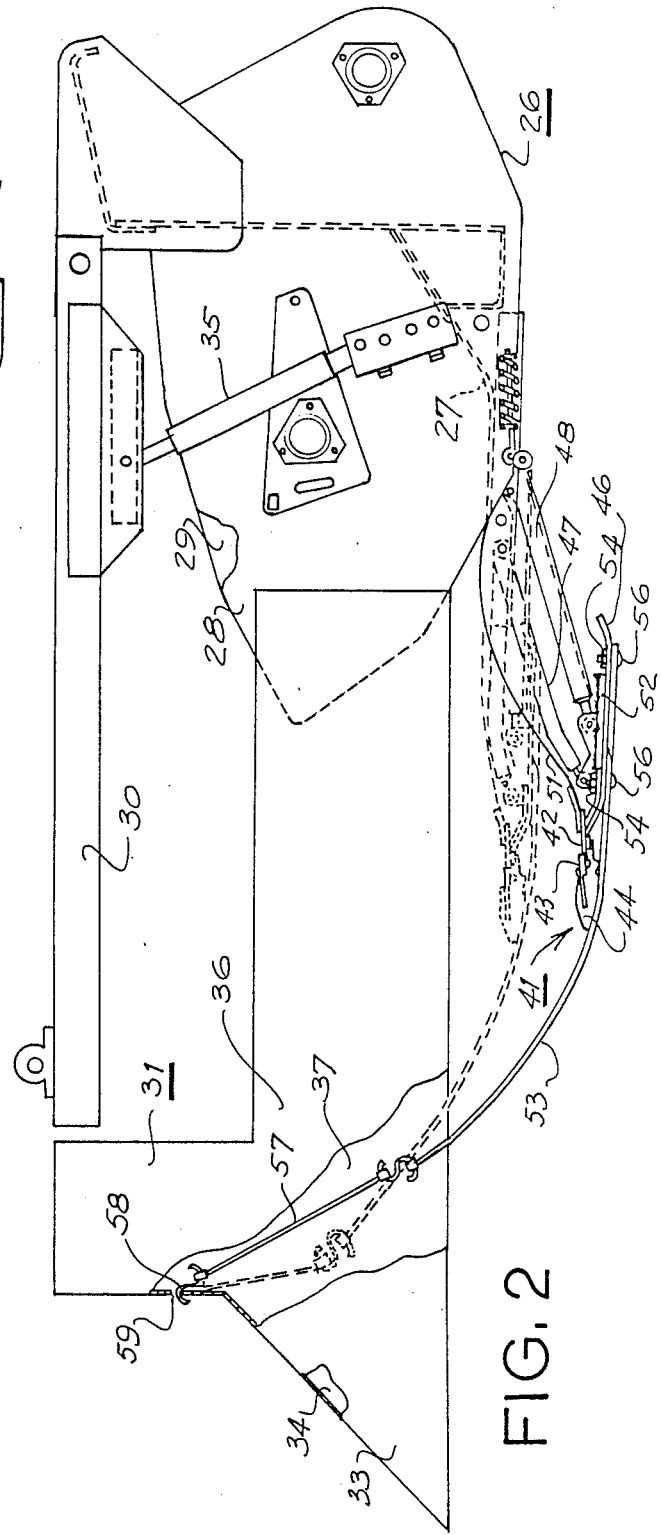
FIG. 2 is a side elevation view of a combine header incorporating the skid plate of this invention.
Figures 3, 4:
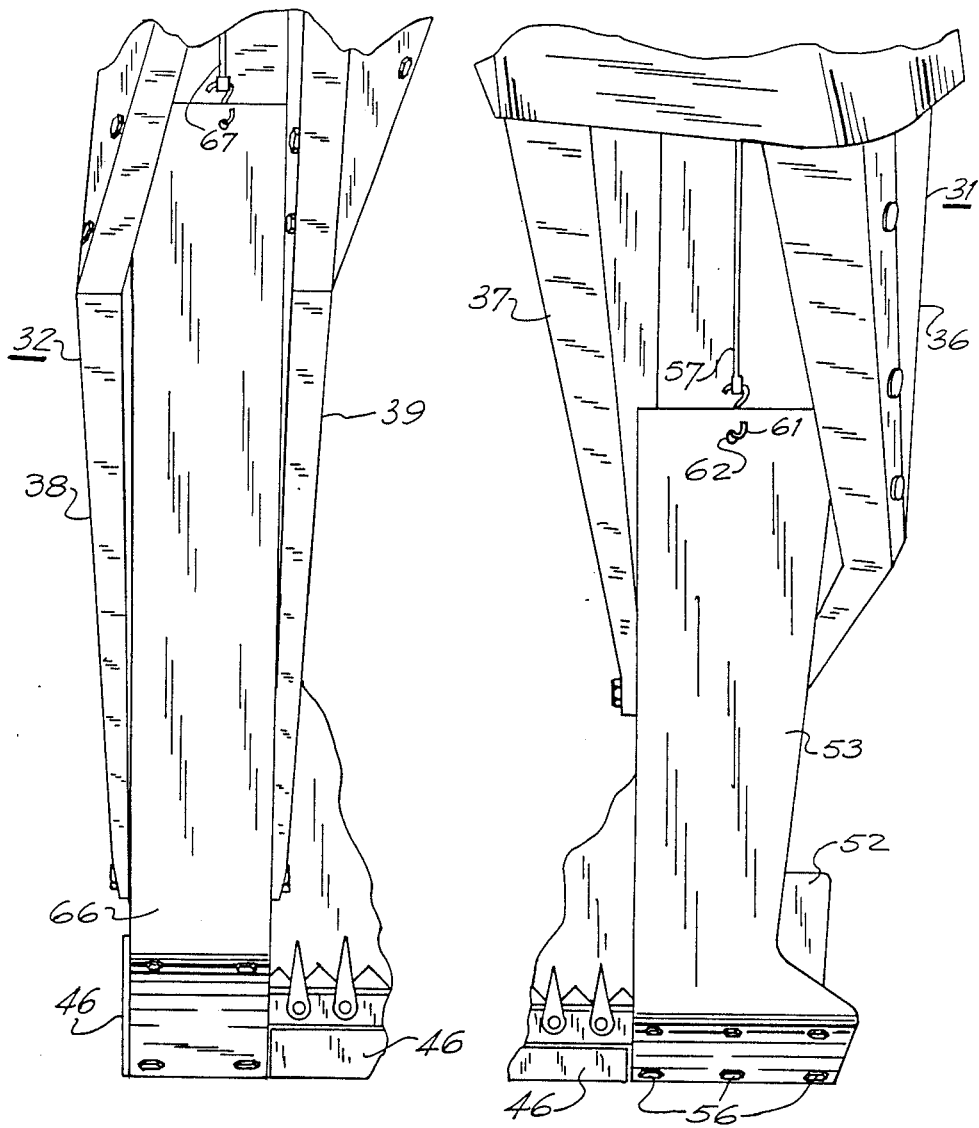
FIG. 3 is a pictorial view, from the front underside, of the skid plate installation beneath the divider on one side of the header.
FIG. 4 is a bottom front pictorial view of the skid plate installation beneath the divider at the other lateral end of the header.

Referring to FIGS. 2-4, crop header 26 is shown detached from the front of the combine on which it is used. The header 26 includes a horizontal platform 27 which extends laterally between side walls 28, 29 at laterally opposite ends thereof. A pair of reel support arms 30, only one of which is shown, have their rear ends pivotally connected to laterally opposite ends of the header 26 and the reel, not shown, mounted on the front ends thereof, is raised and lowered by a pair of hydraulic actuators 35, only one of which is shown. A pair of longitudinally extending dividers 31, 32 are connected at their rear ends to the side walls 28, 29, respectively. Each of the dividers 31, 32 terminate at their front ends in points 33, 34. As shown in FIG. 4, the divider 31 includes a pair of laterally spaced side walls 36, 37 which define a cavity or pocket with an open bottom. Similarly, the divider 32 includes a pair of laterally spaced side walls 38, 39 defining an interior cavity with a downwardly open bottom.

The header 26 is equipped with a floating cutterbar assembly 41 which includes a cutterbar 42 on which a sickle bar 43 is mounted for reciprocating movement and to which guards 44 are secured. A series of laterally spaced ground pads 46 are secured to the cutterbar 42 and each of the pads 46 are connected to the header platform 27 by a parallel linkage including an upper link 47 and a lower link 48. The cutterbar 42 is free to floatingly follow the ground contour during a harvesting operation. However, its weight is counterbalanced to a large degree by compression springs 49, only one of which is shown, and a plurality of side-by-side and slightly overlapping sheet springs 51 bridging the space between the cutterbar 42 and the front end of the platform 27. A wobble drive unit 52 for driving the sickel bar 43 is secured to one lateral end of the cutterbar 42 through its mounting on the pad 46 at that end. The pads 46 intermediate the opposite end portions of the floating cutterbar assembly 41 are designed to slidingly support the cutterbar on the ground. For the most part, the pads 46 prevent the cutterbar from becoming embedded in the ground. However, on occasion it has been found that the heavier wobble drive end will become plugged with mud when operating in sticky, wet soil conditions, particularly when the prior art metal skid plate has become damaged and deformed so as to reduce its effectiveness. In order to avoid such difficulties, a plastic skid plate 53 fabricated from a sheet of high density plastic (such as ultra high molecular weight polyethylene) is secured at its rear end to the underside of the end skid pad 46 by releaseable fastening means, namely nuts 54 and bolts 56. The front end of the flexible skid plate 53 is yieldingly connected to the front part of the divider by an elongated, resiliently extensible member or connector in the form of an elastic band 57. An S-shaped metal hook 58 at the upper end of the band 57 is releasably hooked in an opening 59 in a forward facing wall of the divider 31 and an S-shaped hook 61 at its bottom end is releasably hooked in an opening 62 in the elastic plastic skid plate 53. In a similar manner a plastic skid plate 66 is bolted to the pad 46 at the other end of the floating cutterbar 41 and and has its front end connected to the front part of the divider 32 by an elastic connector 67. As shown in the drawings, the forward ends of the plastic skid plates 53, 66 extend forward and upward through the open bottoms and into the interior cavities of the respective dividers 31, 32.

In operation the high density plastic skid plate 53, 66 have shown an ability to withstand the impact of rocks and the like without breaking or becoming deformed. The ground engaging surfaces of the high density plastic skid plates 53, 66 have a much lower coefficient of friction than the steel plates of the illustrated prior art device. The elastic members 57, 67 stretch or contract to accommodate vertical movement of the cutterbar 42 relative to the dividers during a harvesting operation while retaining the front end of the skid plates in a protected position to skid over ground irregularites.

The embodiments of the invention in which an exclusive property or privilege is claimed are defined as follows:

1. In combination with a combine having an adjustable height header with a horizontal platform and a pair of longitudinally extending crop dividers connected, respectively, to laterally opposite ends of the platform,
   a floating cutterbar in front of and extending laterally across the width of said platform, said floating cutterbar being connected to said platform for upward and downward swinging movement relative thereto,
   a pair of flat longitudinally extending flexible skid plates having horizontally disposed rear portions rigidly secured, respectively, to the undersides of the laterally opposite ends of said floating cutterbar and front portions extending forward and upward in relation to said floating cutterbar and beneath said dividers and
   a pair of resiliently yieldable connectors interconnecting, respectively, said forward portions of said skid plates with forward parts of said dividers.

2. The combination of claim 1 wherein said connectors are elongated resiliently extensible members.

3. The combination of claim 1 wherein said skid plates are made of flexible high density plastic material of uniform thickness and with a smooth non-stick bottom surface.

4. The combination of claim 1 wherein said dividers each have laterally spaced side walls defining a cavity with a downward open bottom and wherein said forward ends of said skid plates extend upward through said open bottoms so as to be disposed between said side walls.

* * * * *